(12) United States Patent  (10) Patent No.: US 9,094,922 B2
Soulhi et al.  (45) Date of Patent: Jul. 28, 2015

(54) SPLITTER WITH ADAPTIVE POWER DISTRIBUTION

(75) Inventors: Said Soulhi, Saint Constant (CA); Taoufiq Abouzid, Riyadh (SA)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 849 days.

(21) Appl. No.: 13/265,299

(22) PCT Filed: Apr. 9, 2009

(86) PCT No.: PCT/EP2009/054291
§ 371 (c)(1), (2), (4) Date: Jan. 11, 2012

(87) PCT Pub. No.: WO2010/115467
PCT Pub. Date: Oct. 14, 2010

(65) Prior Publication Data
US 2012/0100814 A1  Apr. 26, 2012

(51) Int. Cl.
*H04B 17/00* (2006.01)
*H04W 52/24* (2009.01)
*H04B 7/04* (2006.01)
*H04W 52/10* (2009.01)
*H04W 88/08* (2009.01)

(52) U.S. Cl.
CPC ........... *H04W 52/245* (2013.01); *H04B 7/0491* (2013.01); *H04W 52/10* (2013.01); *H04W 88/085* (2013.01)

(58) Field of Classification Search
CPC ........................ H04B 7/0452; H04B 7/0426
USPC .............. 455/562.1, 13.3, 575.7, 272, 279.1, 455/67.14, 67.11
See application file for complete search history.

(56) References Cited

U.S. PATENT DOCUMENTS

| 5,533,011 A | 7/1996 | Dean et al. |
| 7,313,113 B1 | 12/2007 | Hills et al. |
| 2004/0252055 A1 | 12/2004 | Thomas et al. |
| 2009/0042593 A1 | 2/2009 | Yavuz et al. |
| 2009/0061939 A1 | 3/2009 | Andersson et al. |

FOREIGN PATENT DOCUMENTS

CN  1586023 A  2/2005

*Primary Examiner* — Eugene Yun
(74) *Attorney, Agent, or Firm* — Coats & Bennett, PLLC

(57) ABSTRACT

The invention relates to a splitter (40) of an indoor cellular network, with a plurality of antennas transmitting downlink signals and receiving uplink signals, the splitter (40) distributing power to said plurality of antennas for a transmission of the downlink signals. The splitter adapts the signal power of the downlink signal for one antenna in accordance with the uplink signal received at said antenna.

24 Claims, 14 Drawing Sheets

SPLITTER WITH ADAPTIVE POWER DISTRIBUTION

TECHNICAL FIELD

This invention relates to a splitter connected to a plurality of antennas of an indoor cellular network and to a method for controlling a power distributed via the splitter to a plurality of antennas of the indoor cellular network.

BACKGROUND

Indoor cellular systems are becoming increasingly spread, as user demands for everywhere coverage are matched by the opportunity for mobile operators to offer improved services and increase traffic revenues. The owners of the building, in which the indoor cellular system is provided, also benefit from such a system, as the value of their property and their ability to attract and retain key tenants increases.

It is estimated that two thirds of all calls are made from inside a building and, with the increased demands for high data traffic capabilities, there is a growing need for improved capacity and coverage from indoor users.

An in-building cellular system offloads surrounding macro sites and ensures a higher quality of service for indoor users.

One of the basic components provided in a distributed antenna system (DAS) is the power splitter, which divides the power from a radio base station, NodeB or eNodeB for distribution to several antennas. The splitter distributes the signal equally to multiple antennas and is normally a passive component that has one input and several outputs. The splitter is an RF component which cannot amplify the input signal and splits it at the output only. By way of example, in case of a 2-way splitter, the splitter splits the input signal power into two equal output powers, whereas, in case of a 3- or 4-way splitter, the splitter splits the input signal in three and four equal output power signals, respectively. The 4-way splitter, by way of example, splits power fed at its input equally to each of the four antennas connected to the respective output port.

In FIG. 1 a splitter 10 as known in the prior art is shown in further detail. The splitter 10 comprises an input port 11 to which the total power $P_{total}$ is fed for distribution to different output ports 12. The splitter shown in FIG. 1, a 3-way splitter, comprises three output ports 12 to which the total power $P_{total}$ is distributed. In the splitter shown the power is equally distributed to each output port with $P_{total}=P1+P2+P3$ with $P1=P2=P3$.

This traditional splitter does not consider the traffic load at the antennas connected to the different output ports so that the power will be split independently of the number of mobile stations connected to the antennas.

Furthermore, antenna problems can cause a significant degradation of coverage in cells of the network. It is very difficult and costly for an operator to detect these antenna problems, unless they cause severe and acute radio problems. As a consequence many antenna installation problems are hidden for the operator or are mistaken for general cell plan issue, interference problem or even a problem with radio network functionality.

With the current architecture of an indoor cellular network it is not possible to optimize the power and to manage the power distribution flexibly in terms of carried traffic by each antenna. As a consequence a major part of the radio base station power is wasted in the building distributed antenna system.

Additionally, antenna problems can only be found easily, when the antenna is directly connected to the radio base station as it is the case for outdoor cellular systems. In case of an indoor cellular network, antennas are normally not directly connected to the radio base station. They are connected to the radio base station through MCM (Multi Casting Matrix) and splitters/tapers. Antennas and feeders which are connected to chain of passive components, such as splitters or tapers, can not be detected.

SUMMARY

Accordingly, a need exists to be able to effectively manage the power distribution of an indoor cellular system and to be able to detect faulty antennas of an indoor cellular network in an efficient way.

These needs are met by the features of the independent claims. In the dependent claims further embodiments of the invention are described.

According to a first aspect of the invention, a splitter connected to a plurality of antennas of an indoor cellular network is provided, the antennas transmitting downlink signals and receiving uplink signals. The splitter distributes power to said plurality of antennas for the transmission of the downlink signals, wherein the splitter comprises a signal determining unit that is determining for one of the antennas a signal strength of the uplink signal, wherein the splitter is adapted to distribute the power to said one antenna for transmitting the downlink signal in accordance with the signal strength of the uplink signal received by said one antenna. The splitter is able to control the transmitted power transmitted to said one antenna and to adapt the transmitted power in proportion to the received power. If in an area covered by one antenna a weak traffic is noticed, the transmitted power is reduced proportionally. The signal determining unit measures the signal strength of the uplink signal received by an antenna connected to one output port of the splitter, the splitter adapting the signal power for the downlink signal for said output port accordingly. With such a splitter the transmitted total power can be efficiently used in such a way that more and more antennas can be used to cover a building, since the power can be intelligently split in all building areas depending on the carried traffic by each antenna. Additionally, there is no need to use power tapers in that distributed antenna system, since the intelligent splitter can split the power efficiently.

Furthermore, less radio base stations are needed in view of the optimized power distribution, as a single radio base station can serve a larger number of antennas.

According to a preferred embodiment of the invention, the splitter is configured in such a way that it distributes the power to each of the antennas connected to the splitter in accordance with the respective uplink signal of the antennas. The intelligent splitter controls the power flows at each output port depending on the carried traffic by each of the antennas connected to the corresponding output port. In case this flexible power distribution is used in substantially all the splitters of an indoor cellular system, a considerable amount of power can be saved at some of the antennas and distributed to other antennas where it is more needed.

Preferably, the signal determining unit determines the signal strength of the uplink signals originating from a predetermined part of the building in which the indoor cellular network is installed. By way of example, the signal determining unit may determine the uplink signal strength of mobile stations provided in a room in which said antenna is provided. The splitter preferably distributes to each antenna a signal for the downlink signal having a signal strength that is proportional to the respective uplink signal strength. This means, when the uplink signal strength for one of the antennas connected to the splitter will be high and will be lower for another antenna of the splitter, the downlink signal will be higher for said one antenna than for said other one.

Preferably, the splitter is configured in such a way that the splitter distributes to each antenna a downlink signal with a minimum power. Normally the uplink signal will never be exactly zero, since there is the uplink signal received by the antenna due, for example, to reflection of other uplink signals received from mobile stations located at larger distances. Furthermore, the control channels provided in the indoor cellular network will not be affected, since there will be a minimum power transmitted from a radio base station via the splitter to each of the antennas.

For adjusting the power distributed by the splitter to one of the antennas the splitter may comprise an automatic load adjusting unit adjusting the power distributed to said one antenna. The load adjusting unit then automatically adjusts the load of the output port connected to said one antenna in accordance with the uplink signal strength received by said one antenna. Based on the uplink signal strength determined by the signal determining unit a port load of the output port, to which said one antenna is connected, is adjusted automatically. The signal determining unit can periodically update the automatic load adjusting unit with the latest measured signal strength values of the uplink signal requesting the automatic load adjusting unit to adjust the corresponding load value for the output port, to which said antenna is connected. By way of example, in case the received uplink signal strength is weak, the port load may be adjusted too low, e.g. 5 Ohm or more, as, in this case, the reflection factor is approximately R=0.82. If the received signal strength of the uplink signal is high due to more users or mobile stations provided on the antenna cell, the port load may be adjusted to a high value, e.g. 48 Ohm or less, as, in this case, the reflection factor will be low, e.g. R=0.02.

The signal determining unit is configured to determine, for said one antenna, the signal strength of each uplink signal picked up by said one antenna separately and to sum up the signal strength to a combined uplink signal strength. The splitter then adapts the signal strength for the downlink signal in accordance with the signal strength of the combined uplink signal strength. Furthermore, the signal determining unit may synchronize the different uplink signals received by said one antenna before the combined uplink signal strength is determined. The combined uplink signal strength can be determined periodically and transmitted as periodic signal strength of the uplink signal to the automatic load adjusting unit that is adjusting the load of the downlink signal, accordingly.

Preferably, the splitter comprises a signal determining unit determining the signal strength of the uplink signal for each output port of the splitter.

The splitter can be connected to different antennas at its output ports, however, it is also possible that the splitter, at one of its output ports, is connected to another splitter. In this situation the splitter distributes the power to said one output port, to which the other splitter is connected, depending on the uplink signals received by antennas connected to said other splitter. Furthermore, it is possible that more than one or all output ports of the splitter are connected to other splitters, the splitter distributing the power to its output ports depending on the respective uplink signals received by the antennas connected to the other splitters.

For visualizing and monitoring the status of the antennas or RF devices connected to the output ports of the splitter the splitter may furthermore comprise a monitoring unit for at least one of its output ports, the monitoring unit monitoring the functioning of an RF device connected to said at least one output port. This monitoring unit can detect non-working antennas and damaged feeders and send an alarm signal indicating that the RF device connected to said output port is not working properly. Preferably, the monitoring unit transmits a test signal periodically to the RF device connected to said one output port and analyzes the feedback signal received in response to the test signal in order to determine whether the RF device connected to said at least one output port is functioning properly or not. By way of example, the monitoring unit may measure the standing wave ratio (SWR) of the received feedback signal of each connected RF device at the splitter port. The monitoring unit can then compare the measured SWR value to a predetermined SWR value registered in it.

Preferably, the splitter furthermore comprises a monitoring port to which said alarm signal output by the monitoring unit is transmitted, when the monitoring unit has detected that the RF device connected to said at least one output port is not functioning properly. From the monitoring port the alarm signal may be transmitted to a central control unit, where the status of the different antennas and splitters is monitored.

The invention furthermore relates to a method for controlling the power distributed by the splitter to the plurality of antennas, the method comprising the steps of determining, for one of the antennas, a signal strength of the uplink signal, in the splitter, wherein the power to said one antenna for transmitting the downlink signal is distributed in accordance with the signal strength of the uplink signal received by said one antenna. As discussed above this method allows to efficiently split the power to the different antennas of the indoor cellular system. Preferably, the power is distributed to each of the antennas connected to the splitter in accordance with the respective uplink signal of the different antennas. As several mobile stations may transmit signals to the antenna, the signal strength of each uplink signal received by said one antenna can be detected separately and summed up to a combined uplink signal strength for said antenna, the signal strength distributed to said one antenna for the downlink signal being in proportion to the combined uplink signal strength. Preferably, the power distribution to said one antenna is controlled by adjusting the load of the splitter output port in dependence on the signal strength of the uplink signal.

For monitoring the status of the different RF devices of the indoor cellular system it is possible to transmit a test signal to at least one of the output ports of the splitter and to receive a feedback signal from said output port and to evaluate the status of the RF device connected to said output port using the feedback signal. The status can be evaluated by comparing the feedback signal to a predetermined value. An alarm signal can then be generated, when it is detected that the feedback signal differs from said predetermined value by a predetermined amount. The alarm signal can furthermore be displayed on a display where the defects of a plurality of RF devices of said indoor cellular system are summarized and visualized.

BRIEF DESCRIPTION OF THE DRAWINGS

The invention further objectives and advantages thereof will best be understood by reference to the following detailed description of illustrative embodiments, when read in conjunction with the accompanying drawings, wherein.

DETAILED DESCRIPTION

Figure 1:
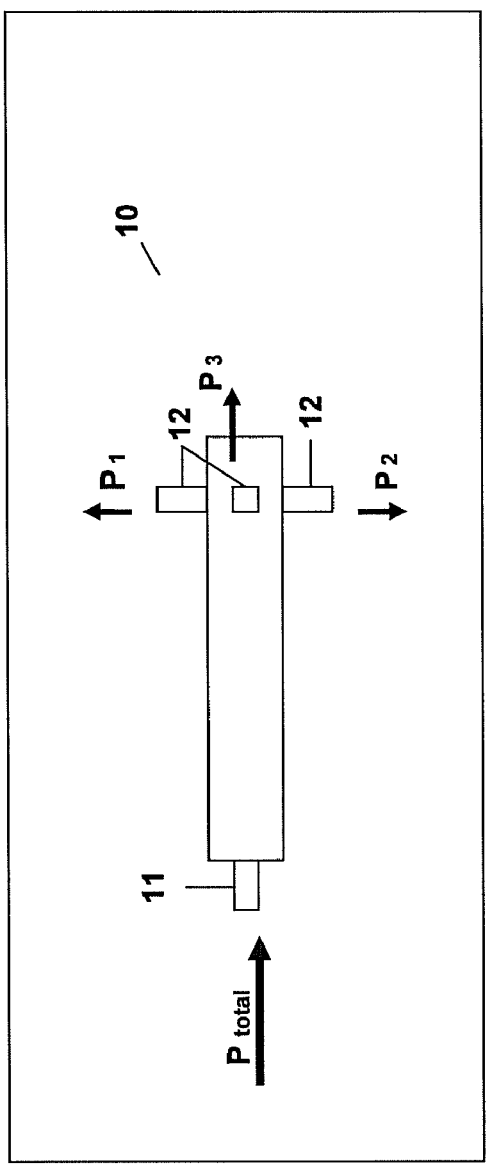
FIG. 1 shows a splitter according to the prior art.
Figure 2:
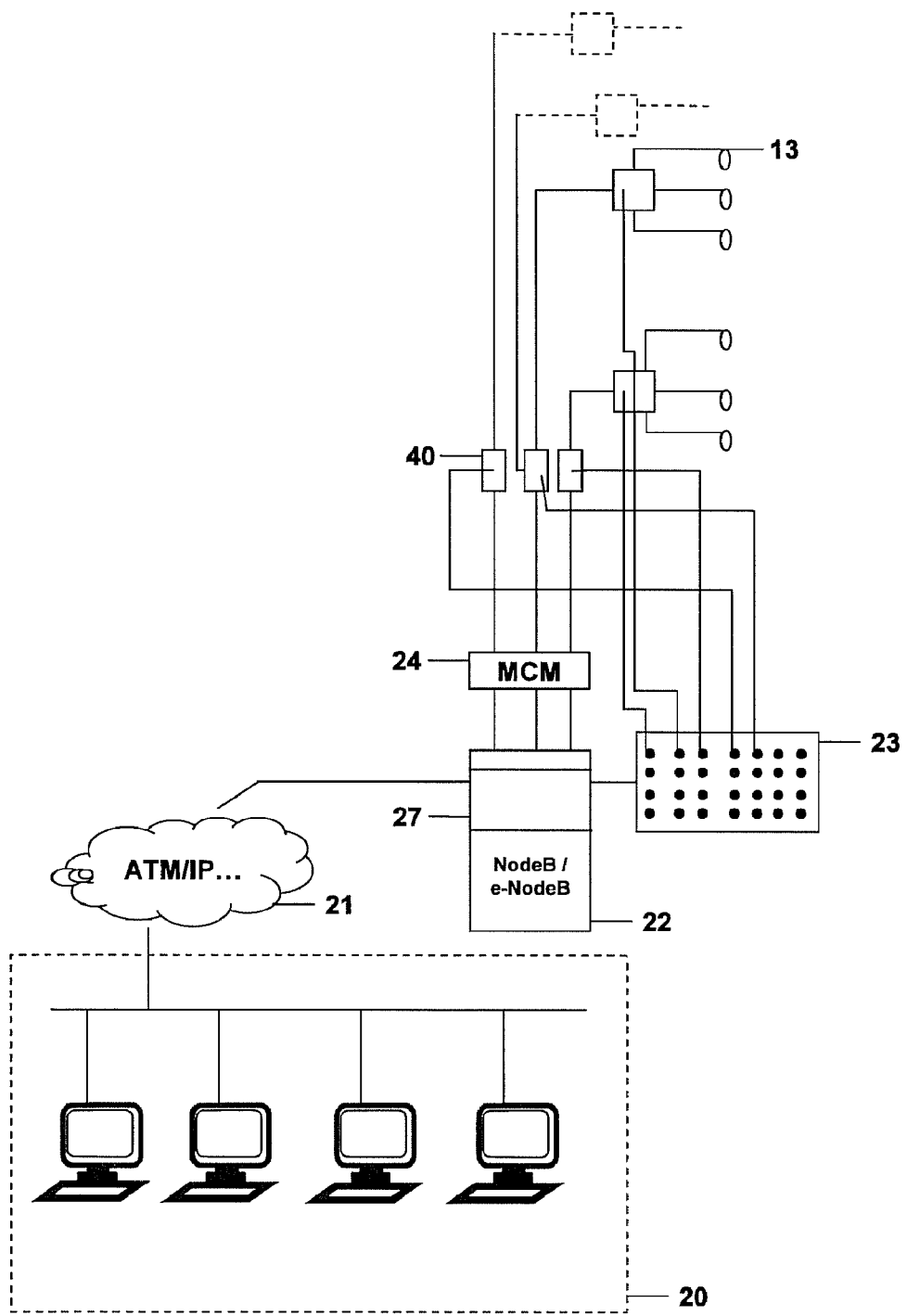
FIG. 2 shows a schematic view of an indoor distributed antenna system allowing to efficiently distribute the power and allowing to monitor the antennas of the system.

In FIG. 2 a schematic view of a distributed antenna system of an indoor cellular system is shown. The system shown distributes power from a radio base station or base station transceiver 22 to a plurality of antennas 13 via power splitters 40. The antennas 13 may be provided in different rooms and/or different levels of the building in which the system shown in FIG. 2 is provided. The power from the radio base station is transmitted to the different splitters 40 via Multi Casting Matrix unit 24. Furthermore, a network control unit 20 is provided controlling the proper functioning of the indoor cellular system and of the RF devices, in particular the antennas. Each of the splitter is connected, e.g. via a twisted pair cable through a monitoring port 47 of the splitter shown in FIG. 4 to a control matrix 23 of the distributed antenna system. The functioning of the monitoring port will be explained in further detail later on with reference to FIGS. 6 and 14. The control matrix 23 is connected via a network control interface 27 of the radio base station to the network control unit 20. By way of example, the communication between the radio station and the network control unit can be carried out over an IP network, e.g. using the ATM (Asynchronous Transfer Mode) data transmission technology, ATM being a packet switching protocol encoding data into small, fixed-sized cells.

As can be seen from FIG. 2 the antenna 13 may be directly connected to the splitter, however, the splitter may also be connected to another splitter resulting in a cascaded arrangement of splitters. In the embodiment shown in FIG. 2 three antennas are connected to one splitter. However, it should be understood that the number of antennas could be connected to one splitter, by way of example, the splitter may have two, three or four antennas connected to the different output ports of the splitter (not shown in FIG. 2).

Figure 4:
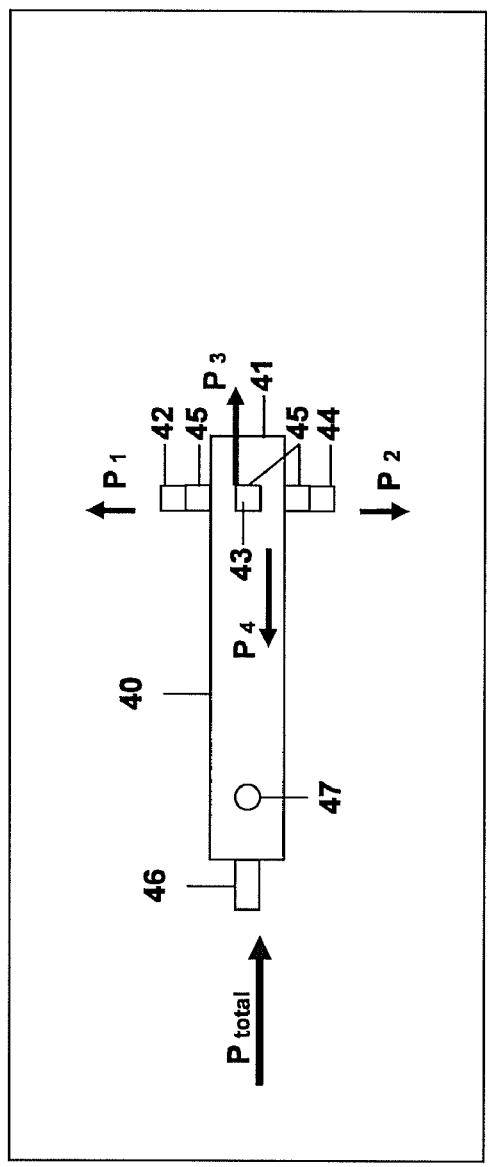
FIG. 4 shows a splitter allowing to efficiently distribute the power to its output ports.

In FIG. 4 the splitter 40 is shown having an input port 46, where the total power distributed $P_{total}$ is received. The splitter, in the embodiment shown, is a 4-way splitter having four output ports 41 to 44. At each of the output ports an intelligent electronic filter 45 is provided adapting the power of the downlink signal for each of the output ports depending on the received uplink signal strength received at each of the output ports. The splitter furthermore comprises a monitoring port 47, which will be discussed in further detail below in connection with FIG. 14. The filter 45 at each of the output ports is able to variably adjust the load of each output port.

Figure 5:
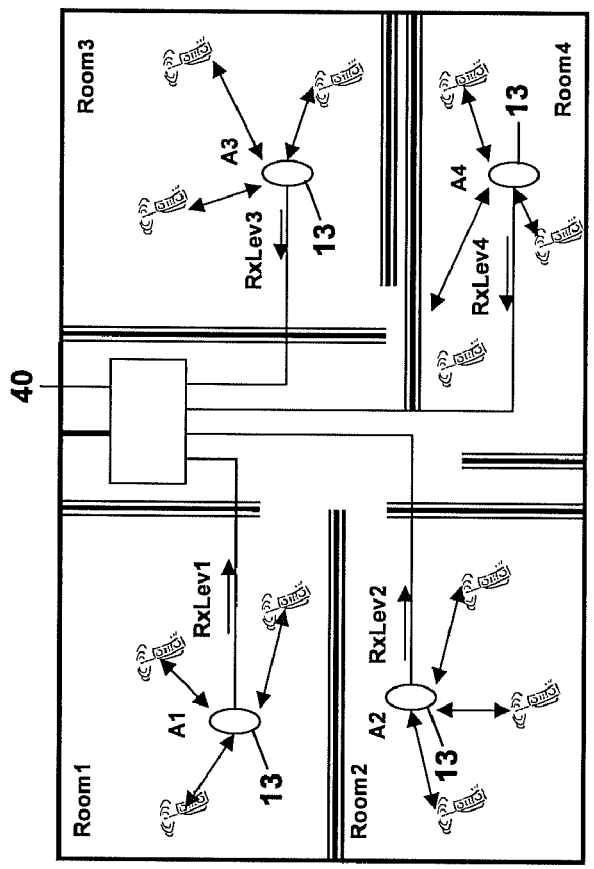
FIG. 5 shows an embodiment of the indoor cellular system with antennas in different rooms.

In FIG. 5 a first example of an indoor cellular system distributing power depending on the received uplink signal strength is shown. In the embodiment shown the splitter 40 is connected to four different antennas 13 in four different rooms. In each room three mobile stations are provided, all the mobile stations having line of sight with the corresponding antenna. When each of the mobile stations is in an active mode, the signal is transmitted to the splitter having a signal strength of RxLev1 for the first room, RxLev2 for the second room, RxLev3 for the third room and RxLev4 for the fourth room.

Figure 6:
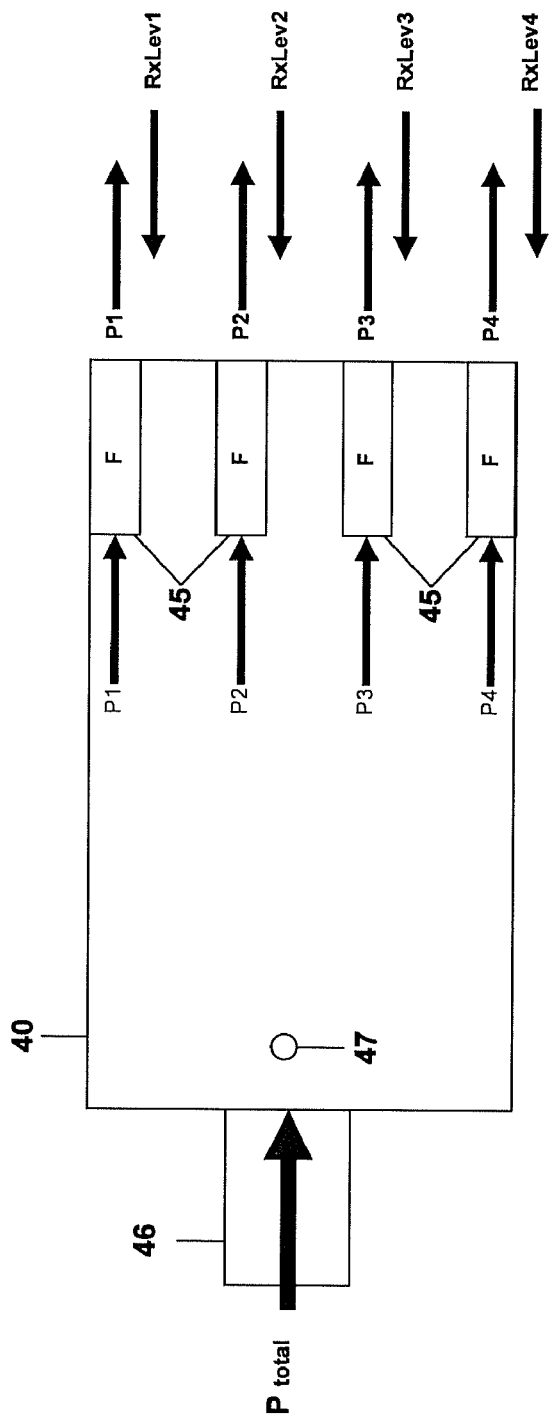
FIG. 6 shows the distribution of power in the splitter for the embodiment shown in FIG. 5.

As also shown in FIG. 6 the filter 45 provided at each output port determines the uplink signal strength at the output port, where it is provided, and lets pass the proportional signal strength or signal power to the mobile station. In the embodiment shown in FIGS. 5 and 6 it is assumed that all antennas are in the dedicated mode so that each mobile station sends RxLev power to the antenna. In the embodiment shown in FIGS. 5 and 6 this means that total RxLev at each antenna is the same, as the number of mobile stations in each room is the same. As a consequence the power distributed to each of the filters provided in the four different output ports is the same with Ptotal=P1+P2+P3+P4 with P1=P2=P3=P4.

Figure 9:
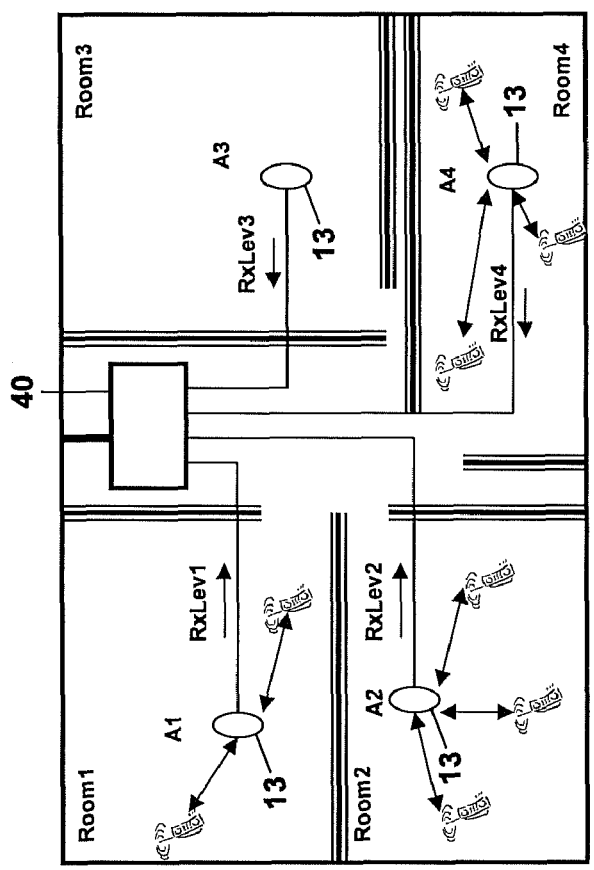
FIG. 9 shows another embodiment of a distributed antenna indoor system with different traffic load in different rooms.
Figure 10:
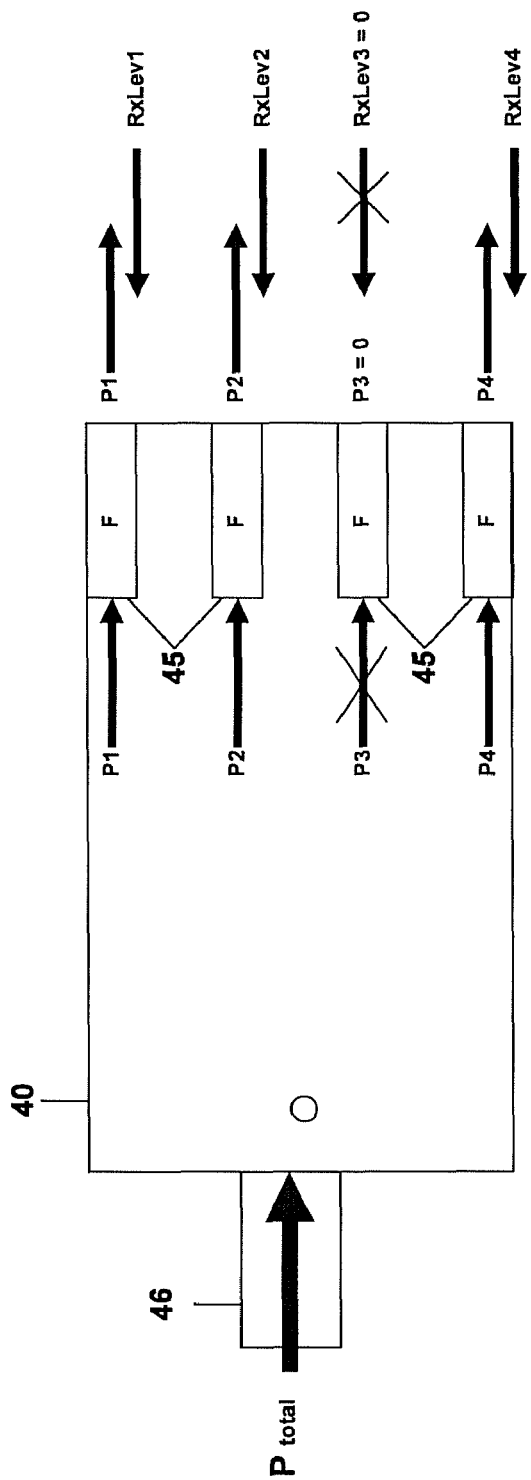
FIG. 10 shows the splitter with a power distribution in an embodiment as shown in FIG. 9.

In FIG. 9 another situation is shown in which no mobile phone in the dedicated mode is present in room 3 whereas two mobile phones are present in room 1 and three mobile phones are present in room 2 and 4. As also shown in FIG. 10 each filter measures the RxLev uplink signal strength sent by all mobile phones in each room and lets pass the proportional Px signal or signal power to the mobile stations. With the number of mobile stations being present as shown in FIG. 9, the uplink signal strength of room 4 will correspond to the uplink signal strength of room 2. The uplink signal strength of room 1 will be smaller than the uplink signal strength of room 2 and 4, whereas substantially no uplink signal strength will be detected by the antenna present in room 3 except low signals from the mobile stations provided in other rooms. The filter 45 provided at each output port of the splitter will adapt the downlink signal for each of the antennas in accordance with the received uplink signal strength. Thus, the highest power will be fed to the antennas present in rooms 2 and 4, whereas a smaller amount of power is transmitted to room 1 and a minimum amount of power is transmitted to the antenna present in room 3. Even though the distributed power distributed to room 3 is shown to be zero by a crossed-out arrow it should be understood that a predetermined minimum power is transmitted in the splitter to the corresponding output port and to antenna 13 provided in room 3.

Figure 7:
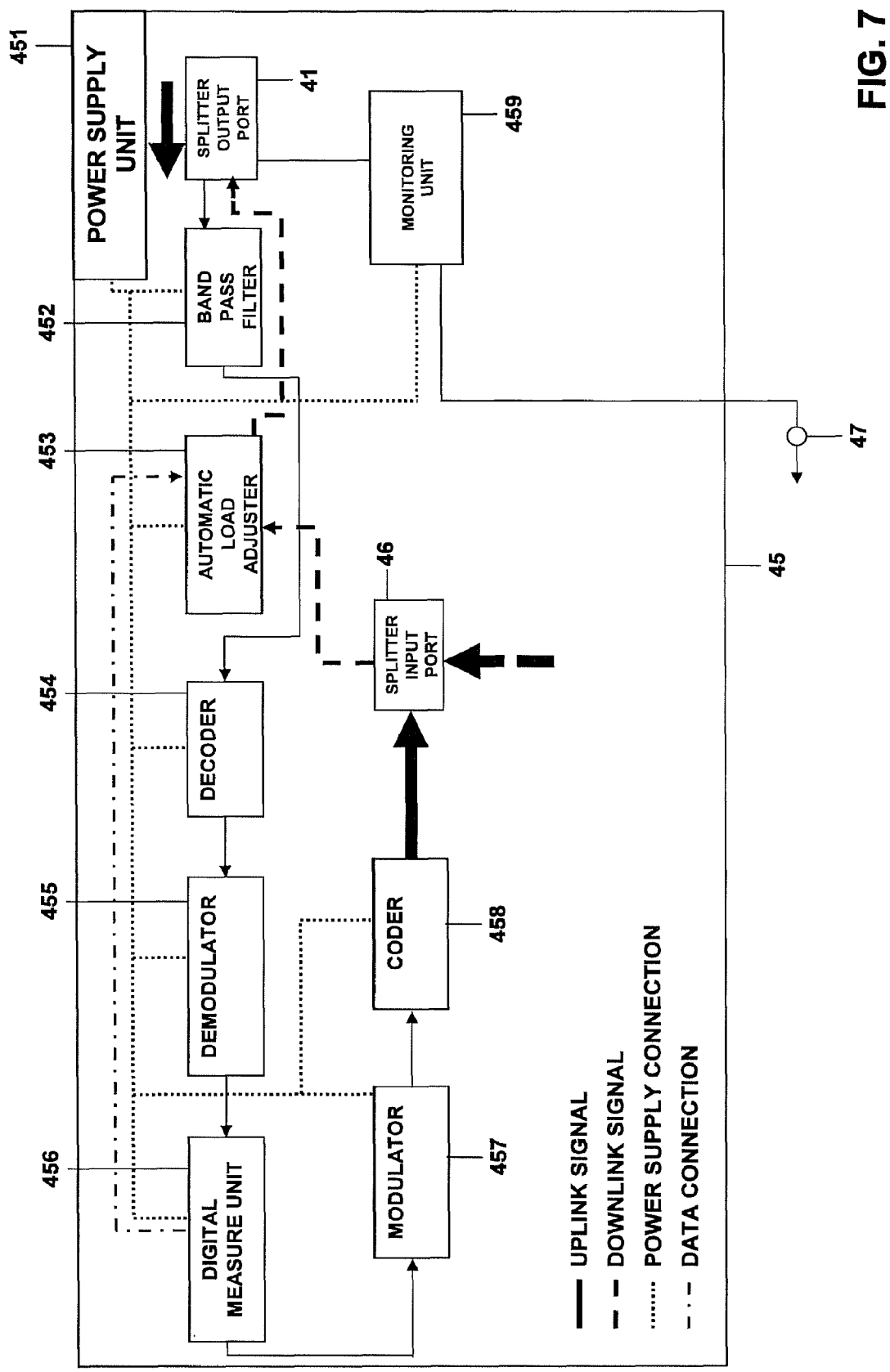
FIG. 7 shows a more detailed view of a filter contained in the splitter adapting the downlink signal strength in accordance with the received uplink signal strength.

A schematic view of the filter 45 adapting the power of the downlink signal is shown in further detail in FIG. 7. The uplink signal received at a splitter output port 41 is first transmitted to a band pass filter 452 that is adapted to let pass the frequency band used in the mobile stations, the band pass filter blocking the other frequencies. The band pass filter 452 reduces the signal processing load in the other processing units provided in the filter 45, as only the relevant uplink signals will be able to reach a decoder 454 that decodes the filter uplink signal. This decoder 454 helps to demodulate the uplink signal later on by a demodulator 455 and decodes the received uplink signal. The decoder 454 should know the coding system used by the mobile stations and by the radio base station. The decoder can be informed of the coding system by the mobile station in the uplink signal and by the radio base station in the downlink signal. The decoder furthermore synchronizes each signal received in order to determine the start and the end bits of each uplink signal. From the decoder 454 the signal is then transmitted to the demodulator 455 demodulating the uplink signal so that it can be measured by the digital signal determining unit 456. The demodulator 455 should know previously which type of modulation has been used by the mobile station in order to be able to demodulate the uplink signal correctly.

In the signal determining unit 456 the signal strength of the uplink signal is determined. The signal determining unit 456 digitizes each uplink signal separately and synchronizes each signal with the known start and end bits of each received signal. The signal strength or signal intensity of all modulated uplink signals is then determined and summed up in order to obtain a combined uplink signal strength. This combined uplink signal strength is determined periodically and is communicated periodically to an automatic load adjusting unit 453 as shown by the dash-dot line. The automatic load adjusting unit 453 adjusts the load of the output port in order to adjust the downlink signal received from the splitter input port 46. The automatic load adjusting unit regulates the port load automatically from a low value $\epsilon$ Ohm to 50 Ohm, $\epsilon$ being a parameter for a low value, e.g. between 1 and to 10 Ohms, 50Ω being the impedance of the connected cable and the antenna. The load values are determined by comparing the determined combined uplink signals to predefined signal strength values and to deduce therefrom corresponding load values contained in a database provided in the filter 45. By way of example, the automatic load adjusting unit may periodically calculate the voltage standing wave ratio (VSWR) to adapt the load of the output port. As it is known in the art the most power can be transmitted to an antenna when the impedance of the antenna corresponds to the impedance of the feeding cable and the impedance of the output port, to which the feeding cable of the antenna is connected. Accordingly, if a high signal power should be transmitted to an antenna, an impedance of close to 50 Ohms should be used at the corresponding output port, to which the antenna is connected, when the independence of the antenna and the feeding cable is 50Ω. The automatic load adjusting unit adjusts the load of the output port. After the combined uplink signal strength has been determined, the signal will be forwarded to the modulator 457 for further processing and to fit the RF propagation requirements of the next transmission channel, which may be a feeder cable. The modulation used (8PSK, QAM-16, QAM-64) should be similar to the one used by the mobile station. This is advantageous in order to avoid any incompatibility of the signal processing at the radio base station later on. From the modulator 457 the signal is transmitted to the coding unit 458 where the signal is secured by coding it. The coding is carried out to avoid any wiretapping attack of the signal between the splitter's port and the RF component connected to the input port 46 towards the radio base station.

The signal path of the downlink signal is shown in the dashed line. In the downlink the signal will neither be decoded nor demodulated or measured. The downlink signal will be simply forwarded inside the splitter from the splitter input port 46 to the automatic load adjusting unit 453, where it is attenuated depending on the load value adjusted and generated by the load adjusting unit in accordance with the combined uplink signal strength as determined by the signal determining unit 456. The adjusted load value should play the role of a traditional physical passive load that can be screwed to the splitter port. After attenuation of the downlink signal depending on the signal strength of the combined uplink signal strength, the former is forwarded to the splitter output port 41 to propagate to the RF components connected to this port. Furthermore, a power supply unit 451 is provided providing power to the different units via feeder cables used to connect all other filter components to each other. The power consumption will be minimized as the filter components are only processing the signal. They are not amplifying the signal, so a high power as power supply is not needed. The functioning of monitoring unit 459 of FIG. 7 will be explained in detail later on.

Figure 8:
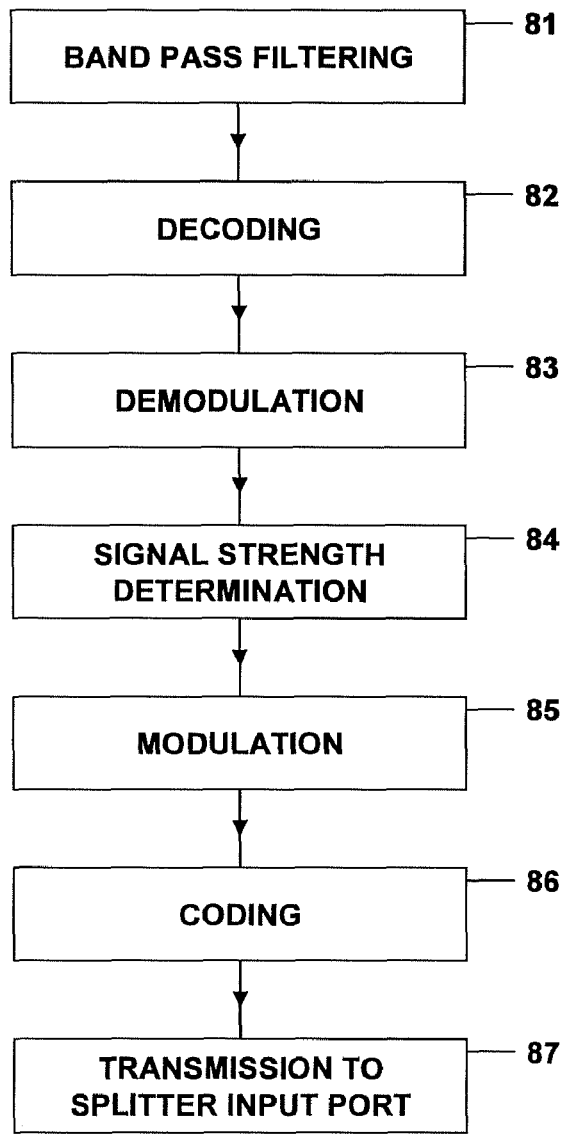
FIG. 8 shows a flow-chart comprising the steps for processing the uplink signal in the splitter.

In FIG. 8 the signal processing steps carried out on the uplink signal are summarized. In step 81 the uplink signal received from the splitter output port is band pass filtered. After filtering the signal the uplink signal is decoded in step 82 and demodulated in step 83. For retrieving the RxLev from each mobile station the uplink signal has to be decoded and demodulated. After the decoding and the demodulation the signal strength can be determined in step 84 wherein the signal strength of each uplink signal is determined, the signal being synchronized and a combined uplink signal strength being determined. In step 85 the signal is modulated again and coded in step 86 before it is transmitted to the splitter input port 87 for further transmission to the radio base station.

Figure 11:
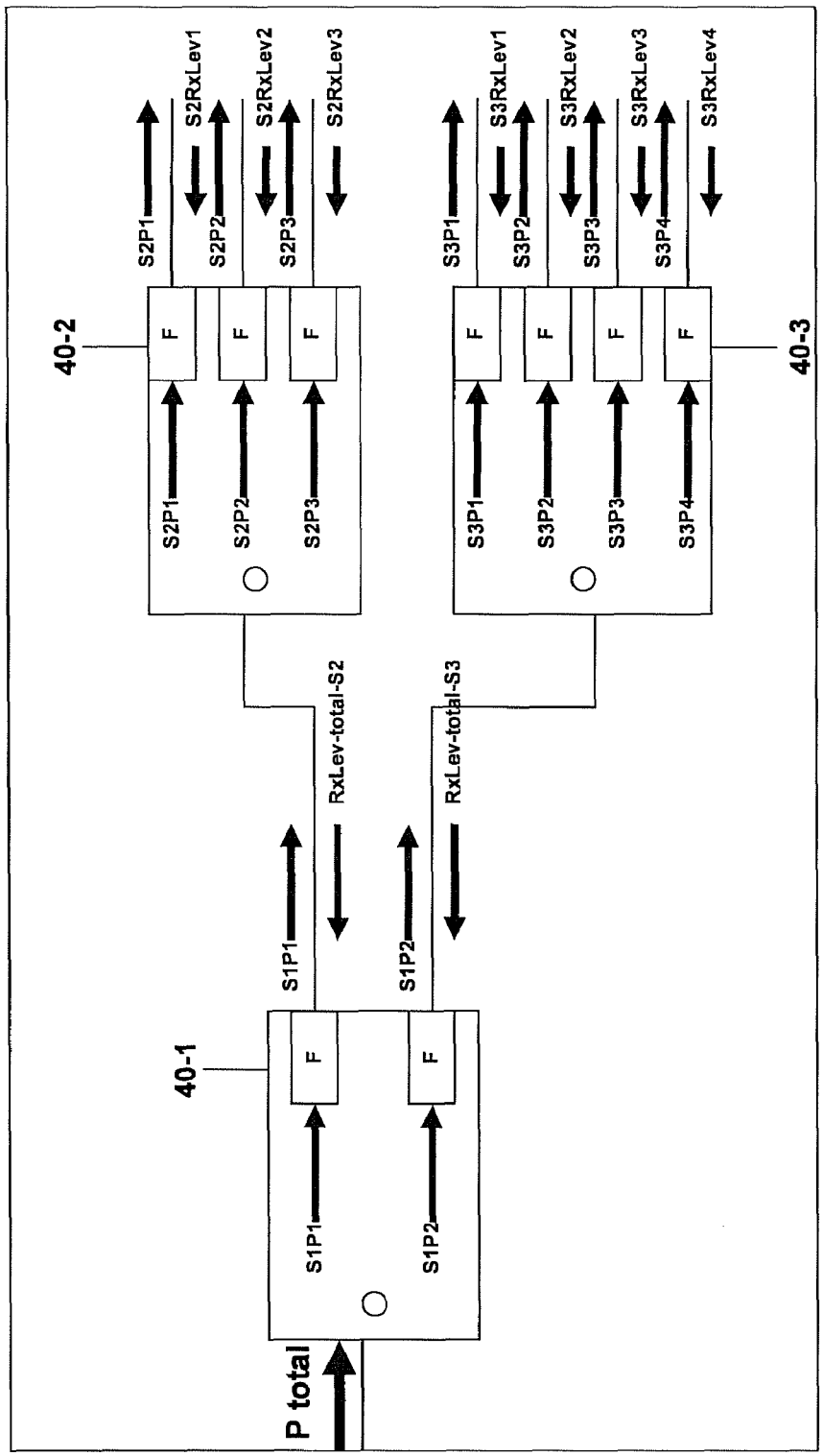
FIG. 11 shows an embodiment with several splitters in a cascaded connection.

In FIG. 11 a cascaded view of a splitter arrangement is shown. A splitter 40-1 is connected at the first output port to splitter 40-2 and at the second output port to splitter 40-3. Splitter 40-2 has three output ports, whereas splitter 40-3 has four output ports. Splitter 40-2 receives the uplink signal S2RxLev1, S2RxLev2 and S2RxLev3, the total uplink signal $RxLev_{total}$-S2 being transmitted to the first output port of splitter 40-1.

Figure 12:
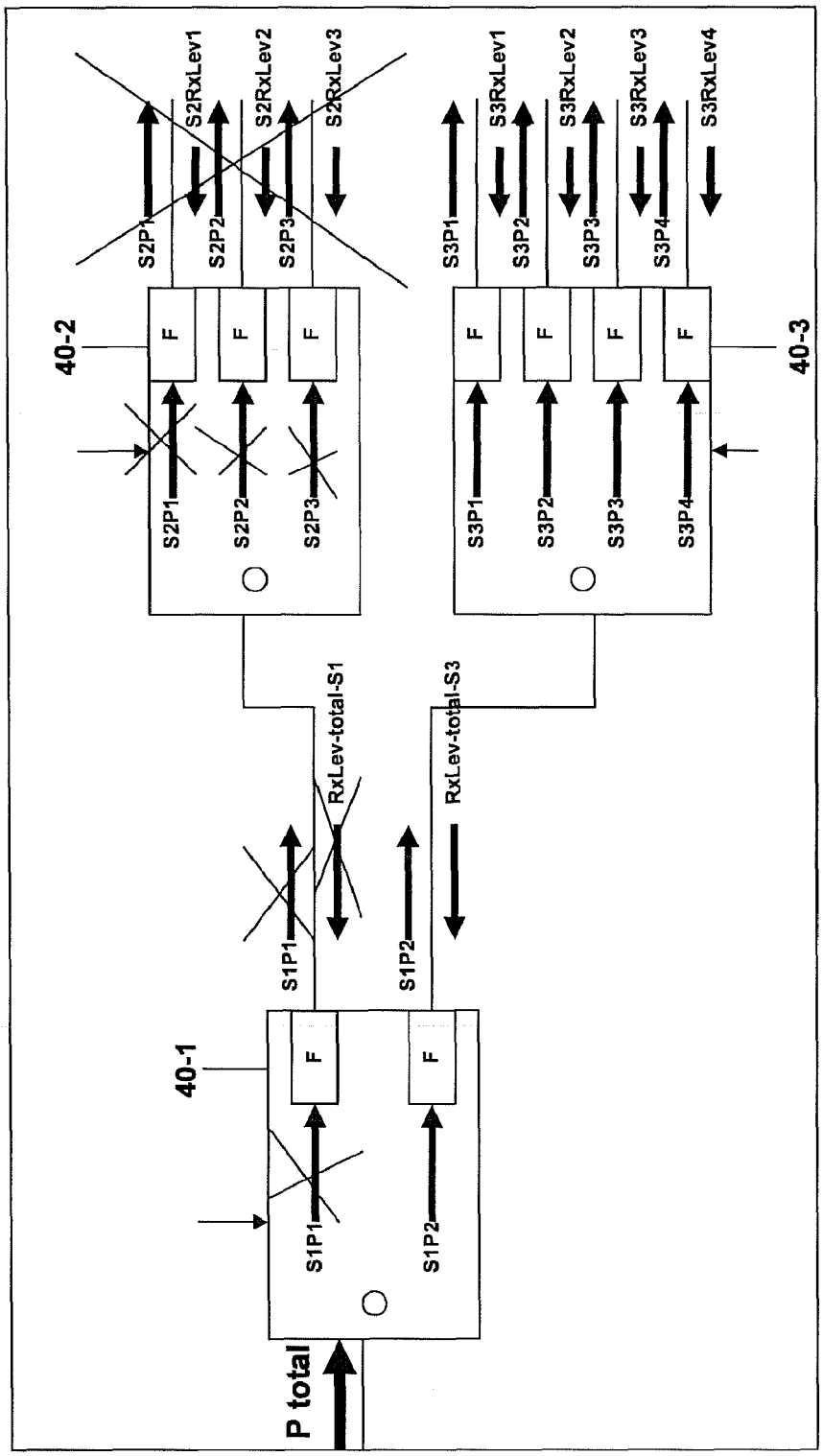
FIG. 12 shows power distribution for an embodiment as shown in FIG. 11.

The splitter 40-3 receives uplink signals S3RxLev1, S3RxLev2, S3RxLev3 and S3RxLev4, the total uplink signal strength being $RxLev_{total}$-S3 received at the second output port of splitter 40-1. Splitter 40-1 now distributes the total power $P_{total}$ in accordance with the signal strength of $RxLev_{total}$-S2 and $RxLev_{total}$-S3 by adapting S1P1 and S1P2 accordingly. Summarizing, each filter provided in the splitters 40-2 and 40-3 measures the RxLev uplink signal sent by all mobile stations and let pass the proportional downlink signal. In FIG. 12 the embodiment shown in FIG. 11 is shown in another situation, where substantially no uplink signal is received by the three antennas connected to the splitter 40-2. In this situation splitter 40-2 will get minimal Tx signal/power because all antennas at its ports are carrying substantially no traffic. Therefore, the receiving signal RxLev coming from splitter 40-2 is very low. As a consequence the transmitted power S1P1 will also be very low.

Figure 13:
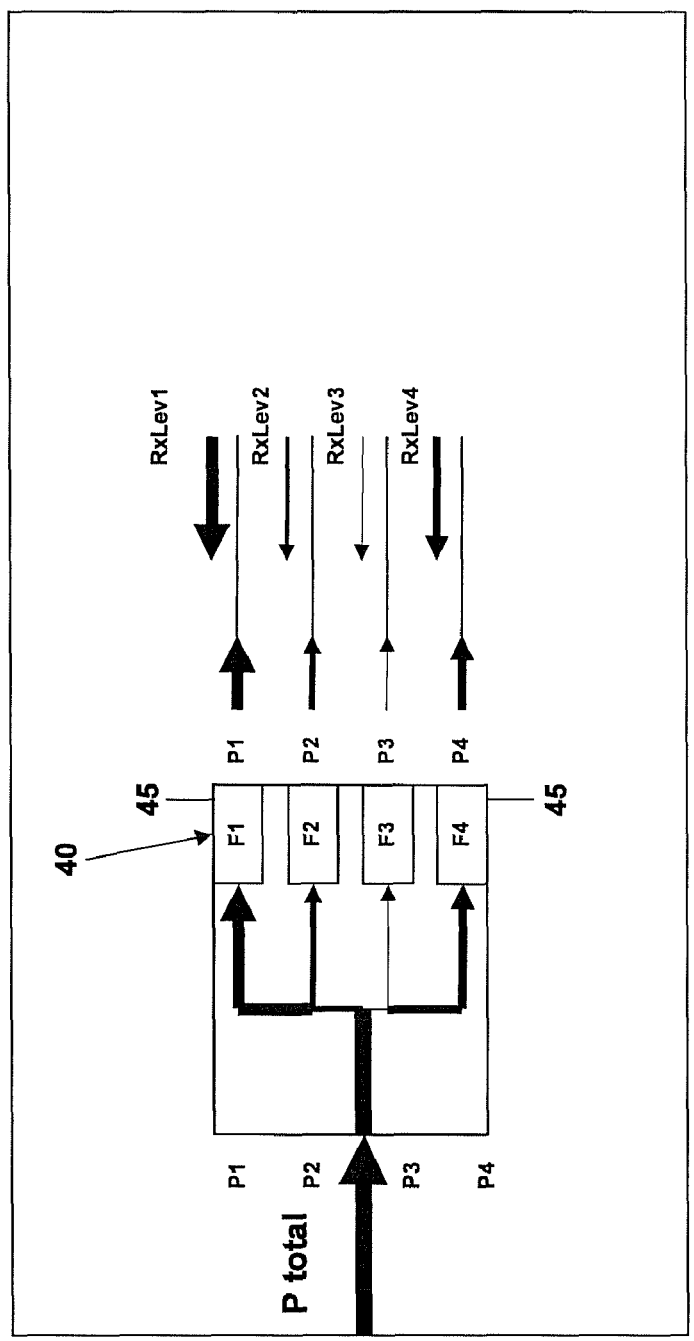
FIG. 13 shows another embodiment for distributing power to each of its output port depending on the received uplink signal strength.

In FIG. 13 another embodiment is shown. In this embodiment the received uplink signal RxLev3 received at filter F3 is lower than the uplink signal strength RxLev2 received at filter F2, which itself is lower than the uplink signal strength RxLev4 received at filter F4. The strongest uplink signal strength is received at filter F1 by RxLev1. The distribution of the total power $P_{total}$ total distributed to the different output ports by the filters is indicated by the different arrows having a thickness proportional to the signal strength received at the corresponding input port. As discussed above, in case of a weak uplink signal, the port load will be adjusted low, close to 5 Ohms or less resulting in a high reflection factor R=0.82. For a strong uplink signal, such as RxLev1, the port load will be adjusted to a high value, e.g. 48 or 50 Ohm, resulting in a low reflection factor R=0.02.

Figure 3:
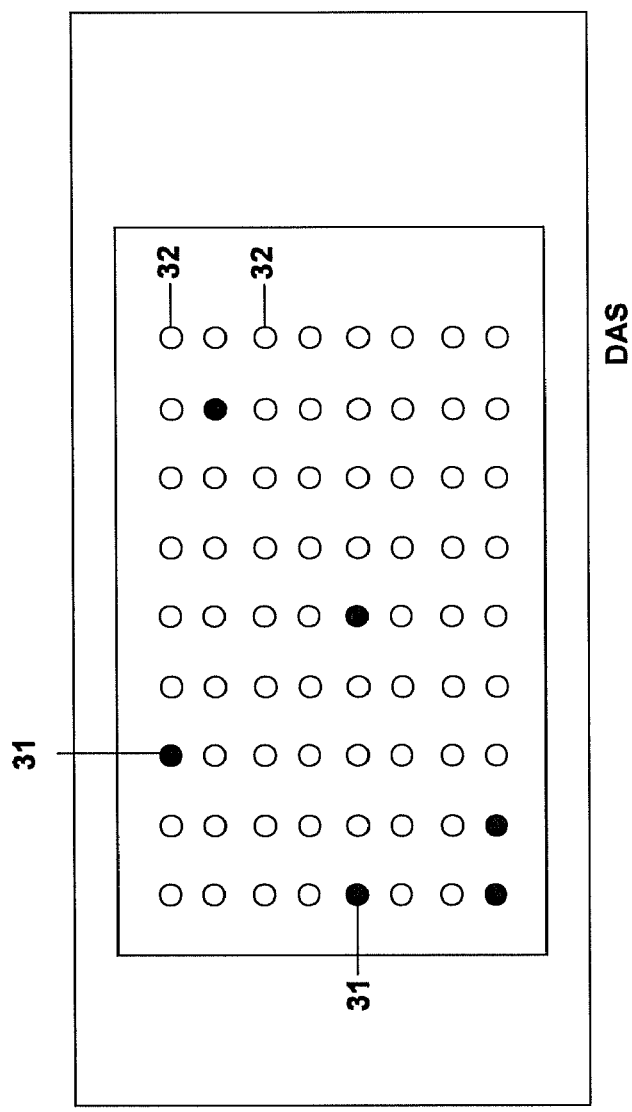
FIG. 3 shows an exemplary view of a display with which the functioning of the RF devices of the indoor cellular system can be visualized.
Figure 14:
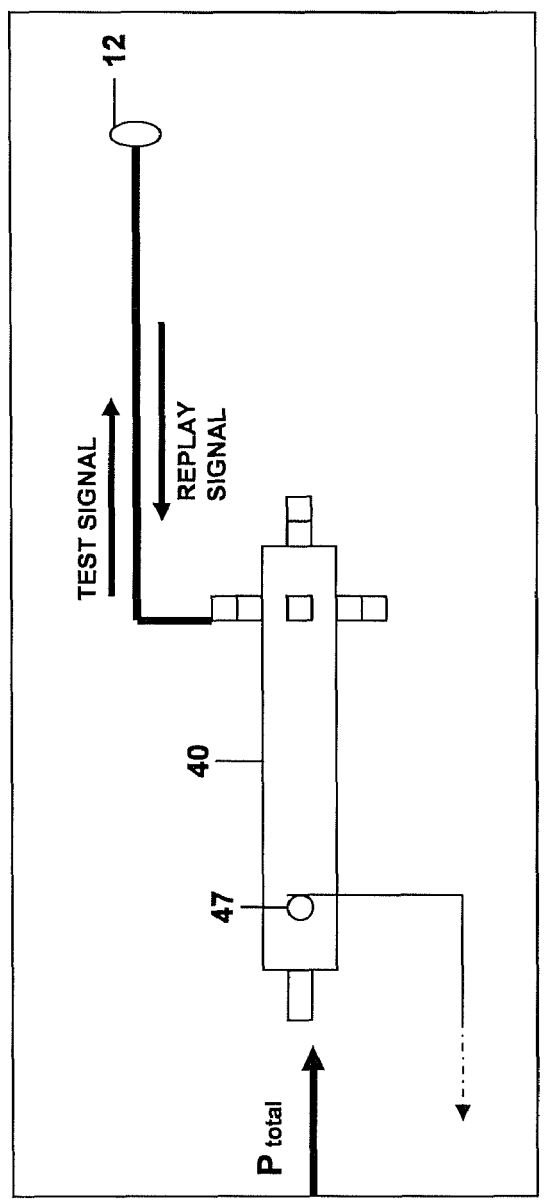
FIG. 14 shows a splitter monitoring the functioning of an antenna connected to one of the output ports.

In connection with FIG. 14 the monitoring unit 459 shown in FIG. 7 is explained in further detail. The intelligent filter furthermore monitors the RF devices connected to its output port. To this end each filter 45 has a monitoring unit 459 transmitting a test signal as shown in FIG. 14 to the antenna via the feeder cable. The monitoring unit then measures the standing wave ratio of the received feedback signal of each connected RF device at said splitter port. The monitoring unit 459 then compares the measured SWR value with known predetermined SWR values. In case the measured SWR value of the feedback signal is not equal to the predetermined value or differs from said predetermined value by more than a predetermined amount, the monitoring unit generates an alarm signal and forwards it to the monitoring port 47 provided in the splitter and further through a cable, e.g. a twisted pair cable, to the control matrix 23, in which each splitter is connected to one port. The control matrix comprises several connectors on its front side. Each monitoring port of a splitter is connected with only one port of the control matrix. The control matrix is directly connected to the network control unit 20 via interface 27 in the base station via a LAN cable. The interface 27 at the radio base station is connected to the network control unit via the ATM network, IP network or others. The status of each RF device, connected to each splitter output port can be monitored and visualized on an alarm visualizing tool. The alarm visualizing tool may be a software provided on the network control unit that is able to display and indicate the exact location of the alarm source in the distributed antenna system as shown in FIG. 3. Furthermore, the details of each RF device connected to the different splitter ports, such as the status, the type, the name and location of the RF device, can be visualized in the alarm visualizing tool. In the embodiment shown in FIG. 3 some of the dots indicate a not properly functioning RF device. In the examples shown the filled data points 31 indicate faulty devices, whereas the non-filled data points 32 show components that are operating correctly. By way of example, the visualizing tool may be designed in such a way that by clicking on the different circles shown in FIG. 3 a window may be opened where the data of the dedicated component are indicated.

The invention claimed is:

1. A splitter configured to distribute power to a plurality of antennas of an indoor cellular network for transmission of a downlink signal, wherein the splitter comprises a signal determining unit configured to determine, for one of the antennas, a signal strength of an uplink signal received by that antenna, wherein the splitter is configured to distribute power to said one antenna, for transmitting the downlink signal from that antenna, in accordance with the determined signal strength of the uplink signal received by said one antenna, and wherein the splitter is configured to distribute, to each antenna, a signal for the downlink signal having a signal strength that is proportional to a respective uplink signal strength determined for that antenna.

2. The splitter according to claim 1, wherein the splitter is configured to distribute power to each of the antennas, for transmitting the downlink signal from those antennas, in accordance with the respective uplink signal strengths determined for the antennas.

3. The splitter according to claim 1, wherein the signal determining unit is configured to determine, for said one antenna, the signal strength of an uplink signal that originated from a predetermined part of a building in which said indoor cellular network is installed.

4. The splitter according to claim 1, wherein the splitter is configured to distribute at least a minimum power to said one antenna.

5. The splitter according to claim 1, wherein the splitter comprises an automatic load adjusting unit configured to adjust the power distributed to said one antenna by automatically adjusting a load of an output port to said one antenna in accordance with the uplink signal strength determined for said one antenna.

6. The splitter according to claim 1, wherein the signal determining unit is configured to separately determine, for said one antenna, a signal strength of each uplink signal received by said one antenna and to sum those determined signal strengths to obtain a combined uplink signal strength, and wherein the splitter is configured to distribute power to said one antenna in accordance with the combined uplink signal strength.

7. The splitter according to claim 1, wherein the splitter comprises a plurality of output ports configured to connect the splitter to one or more of said antennas, and wherein the splitter comprises a plurality of signal determining units that are each configured to determine an uplink signal strength associated with a respective output port, and wherein the splitter is configured to distribute power to the antennas by distributing power to the output ports in accordance with a respective uplink signal strength associated with that output port.

8. The splitter according to claim 1, wherein the splitter is connected to another splitter at one of a plurality of output ports, and wherein the splitter is configured to distribute power to said one output port in dependence on uplink signals received by antennas connected to said another splitter.

9. The splitter according to claim 1, further comprising a monitoring unit for at least one of a plurality of output ports, wherein the monitoring unit is configured to monitor a functioning of an RF device connected to said at least one output port.

10. The splitter according to claim 9, wherein the monitoring unit is configured to periodically transmit a test signal to the RF device and to analyze a feedback signal received in response to the test signal in order to determine whether or not the RF device is functioning properly.

11. The splitter according to claim 9, further comprising a monitoring port, and wherein the monitoring unit is configured to transmit an alarm signal to the monitoring port responsive to detecting that the RF device is not functioning properly.

12. The splitter of claim 1, wherein the signal strength of the signal distributed to each antenna is directly proportional to the respective uplink signal strength determined for that antenna, the proportion of downlink signal power distributed to the port being related to the current uplink traffic load associated with the port by a non-zero constant multiplier.

13. A method for controlling power distributed by a splitter to a plurality of antennas of an indoor cellular network, the method comprising:
   determining, for one of the antennas, a signal strength of an uplink signal received by said one antenna; and
   distributing power to said one antenna for transmitting a downlink signal in accordance with the determined signal strength, by distributing, to each antenna, a signal for the downlink signal having a signal strength that is proportional to a respective uplink signal strength determined for that antenna.

14. The method according to claim 13, wherein said distributing comprises distributing power to each of the antennas in accordance with a respective uplink signal strength of the antennas.

15. The method according to claim 13, further comprising separately detecting a signal strength of each uplink signal received by said one antenna and summing those signal strengths to obtain a combined uplink signal strength for said one antenna, and wherein said distributing comprises distributing power to said one antenna proportional to the combined uplink signal strength.

16. The method according to claim 13, wherein said distributing comprises adjusting a load of a splitter output port, to which said one antenna is connected, in dependence on the signal strength of the uplink signal received by said one antenna.

17. The method according to claim 13, further comprising:
transmitting a test signal to at least one output port of the splitter,
receiving a feedback signal from said at least one output port, and
evaluating a status of an RF device connected to said at least one output port using the feedback signal.

18. The method according to claim 17, wherein said evaluating comprises evaluating the status by comparing the feedback signal to a predetermined value, and further comprising generating an alarm signal when the feedback signal differs from said predetermined value by a predetermined amount, and displaying an indication of the alarm signal on a display that displays any defects of a plurality of RF devices.

19. The method according to claim 13, further comprising:
filtering the uplink signal received by said one antenna,
decoding the filtered signal,
demodulating the decoded signal,
determining the signal strength of the decoded signal,
modulating the decoded signal,
coding the modulated signal, and
transmitting the coded signal to a splitter input port.

20. The method of claim 13, wherein the signal strength of the signal distributed to each antenna is directly proportional to the respective uplink signal strength determined for that antenna, the proportion of downlink signal power distributed to the port being related to the current uplink traffic load associated with the port by a non-zero constant multiplier.

21. A splitter for an indoor cellular network configured to adaptively distribute downlink signal power amongst multiple splitter output ports in proportion to uplink traffic loads associated with those ports, wherein the splitter comprises, for each port, a filter circuit configured to:
determine a current uplink traffic load associated with the port as the sum of the strengths of uplink signals received by one or more antennas connected to the port; and
dynamically adjust the proportion of downlink signal power distributed to the port in dependence on the current uplink traffic load associated with that port.

22. The splitter of claim 21, wherein, for each port, the filter circuit includes an automatic load adjusting circuit configured to dynamically adjust the proportion of downlink signal power distributed to the port by adjusting an impedance of the port in dependence on the current uplink traffic load associated with the port.

23. The splitter of claim 21, wherein the proportion of downlink signal power distributed to the port is directly proportional to the current uplink traffic load associated with that port, the proportion of downlink signal power distributed to the port being related to the current uplink traffic load associated with the port by a non-zero constant multiplier.

24. The splitter of claim 21, wherein different uplink signals received by the one or more antennas connected to the port are desired signals received from different mobile stations.

* * * * *